(12) United States Patent
Loudot et al.

(10) Patent No.: US 8,179,067 B2
(45) Date of Patent: May 15, 2012

(54) ELECTRIC ENERGY EXCHANGE SYSTEM, IN PARTICULAR FOR A HYBRID VEHICLE

(75) Inventors: Serge Loudot, Villiers le Bacle (FR); Gareth Pugsley, Fontenay le Fleuri (FR)

(73) Assignee: Renault S.A.S., Boulogne Billancourt (FR)

( * ) Notice: Subject to any disclaimer, the term of this patent is extended or adjusted under 35 U.S.C. 154(b) by 201 days.

(21) Appl. No.: 12/596,090

(22) PCT Filed: Apr. 14, 2008

(86) PCT No.: PCT/FR2008/050657
§ 371 (c)(1),
(2), (4) Date: Mar. 2, 2010

(87) PCT Pub. No.: WO2008/142339
PCT Pub. Date: Nov. 27, 2008

(65) Prior Publication Data
US 2010/0179023 A1    Jul. 15, 2010

(30) Foreign Application Priority Data

Apr. 16, 2007 (FR) .................................... 07 54492

(51) Int. Cl.
*H02P 27/00* (2006.01)
*B60L 11/02* (2006.01)
*H02M 1/36* (2007.01)
(52) U.S. Cl. ......... 318/400.3; 318/800; 363/34; 363/35; 363/51; 180/65.24
(58) Field of Classification Search ............ 180/65.285, 180/65.275, 65.24; 318/400.3, 762, 800; 363/34, 40, 51, 35
See application file for complete search history.

(56) References Cited

U.S. PATENT DOCUMENTS 7,432,615 B2 * 10/2008 Hjort ............................... 307/64
7,701,087 B2 * 4/2010 Eckroad et al. ................. 307/46
(Continued)

FOREIGN PATENT DOCUMENTS

WO    2005 036297    4/2005
(Continued)

OTHER PUBLICATIONS

Tuckey, A. M. et al., "A New Resonant DC Link/Boost Converter Topology Applied to Extended Speed Operation of a Brushless DC Machine", APEC 98, $13^{th}$ Annual Applied Power Electronics Conference and Exposition, Applied Power Electronics Conference, vol. 1, pp. 294-300, (Feb. 15, 1998).

*Primary Examiner* — Eduardo Colon Santana
(74) *Attorney, Agent, or Firm* — Oblon, Spivak, McClelland, Maier & Neustadt, L.L.P.

(57) ABSTRACT

An electric energy exchange system between at least one motor-generator system and at least one storage member determining a continuous storage voltage between two branches of a bus circuit on which are connected in parallel a DC/DC converter, a filtering capacity, and a DC/AC converter connected on at least one motor-generator system. The system includes at least one thyristor connected as a bypass on the positive bus between the storage member and the output of the converter-voltage raiser to short-cut the converter, and a thyristor priming device to, based on the required voltage at the filtering capacity, determine at least in discharge the shorting of the converter-voltage raiser with direct passage of the current through the thyristor as long as the voltage of the filtering capacity, which is substantially equal to the storage member voltage, is sufficient for the electric machines to provide requested torque. The system can particularly be applied to a power-bypass hybrid vehicle, for continuous variation of transmission ratio.

12 Claims, 5 Drawing Sheets

U.S. PATENT DOCUMENTS

| | | |
|---|---|---|
| 7,939,968 B2 * | 5/2011 | Hjort et al. .................. 307/66 |
| 2004/0084965 A1 * | 5/2004 | Welches et al. ............... 307/64 |
| 2005/0242787 A1 | 11/2005 | Shirokoshi et al. |
| 2007/0058404 A1 | 3/2007 | Yaguchi |
| 2009/0177345 A1 * | 7/2009 | Severinsky et al. ........... 701/22 |

FOREIGN PATENT DOCUMENTS

WO      2005 081387      9/2005

* cited by examiner

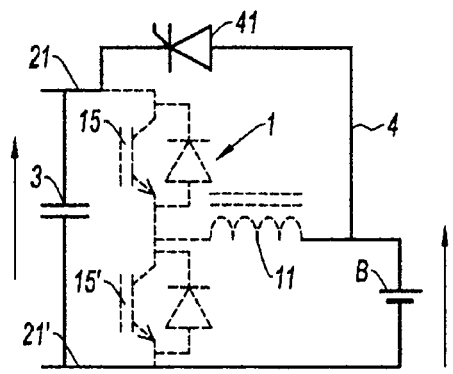
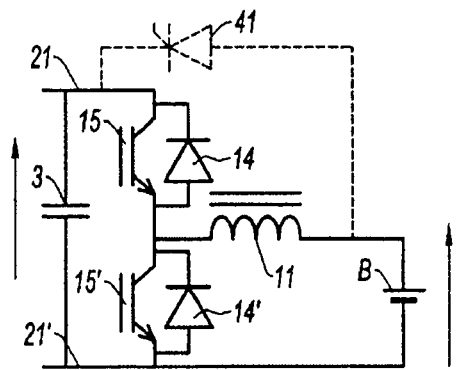
Fig. 6a    Fig. 6b
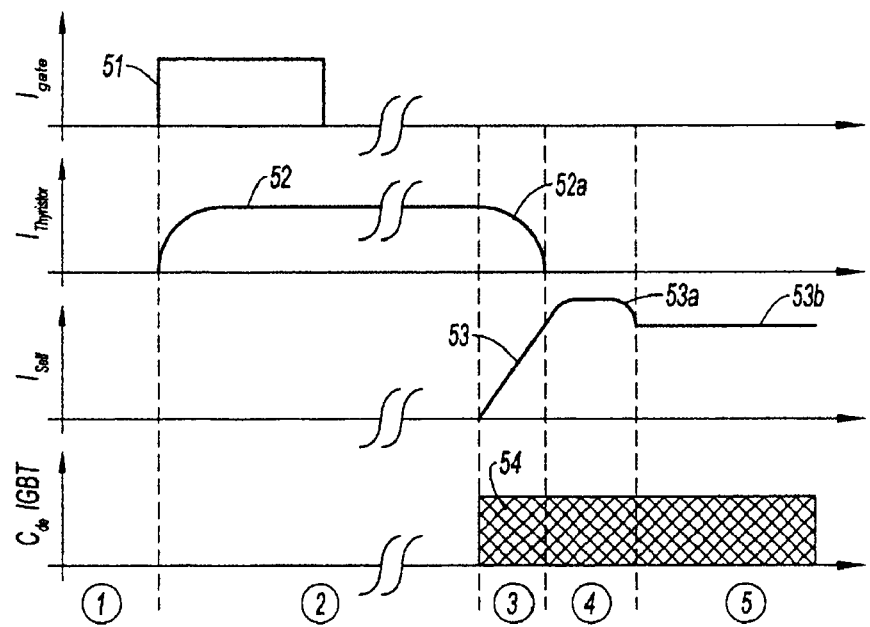
Fig. 7

ELECTRIC ENERGY EXCHANGE SYSTEM, IN PARTICULAR FOR A HYBRID VEHICLE

BACKGROUND OF THE INVENTION

The subject of the invention is a system for electrical energy exchange between at least one motor-generator element and at least one element for storing a DC voltage and applies, in particular, to a vehicle having a so-called "hybrid" propulsion system.

Increasingly severe constraints in terms of the compromise between performance, consumption and emission are leading to the development of so-called "hybrid" vehicles which seem to afford an efficacious solution to all the problems raised.

In a general manner, a hybrid-propulsion vehicle comprises a main engine, for example an internal combustion engine, which propels the driving wheels through a mechanical transmission system, and an electrical power bypass system comprising at least one electric machine wired to an energy storage element such as a battery and able to operate either as a motor providing a torque that is substituted for or added to the torque provided by the main engine, or as a generator providing a DC voltage for recharging the battery from the torque provided by the driving wheels in the case of braking or slowing.

Various hybrid vehicle types are known. Document WO 2005/081 387, for example, describes a system comprising two electric machines able to operate as motor or generator.

In a so-called electrical power bypass operating mode, at least part of the mechanical power provided by the main engine serves to propel a first machine operating as a generator so as to provide electrical power applied to the second machine which operates as a motor applying to the wheels, by way of the transmission system, a torque which depends on the rotation speed of the electric motor. Such a system makes it possible, in particular, to produce a continuous variation of the transmission ratio electrically.

FIG. 1 is a basic diagram of such a vehicle with electrical power bypass comprising an engine M, driving a shaft A connected to the driving wheels R by a mechanical transmission T and, optionally, a differential D and an electrical power bypass system S comprising two motor-generator electric machines MG1, MG2 operating under three-phase current and connected electrically to a battery B, each by way of a DC/AC converter C1, C2.

Indeed, in a known manner, described in the document WO 2005/081 387, the voltage provided, during discharge by the battery B or applied to the latter during charging, is controlled by a DC/DC converter wired to the two terminals, respectively positive and negative, of the battery B, and connected to the two DC/AC converters C1, C2 by a circuit 2 called a "bus" having two branches, respectively positive 21 and negative 21', each wired up, from a nodal point 22, 22', to the two DC terminals, respectively 31, 31' of the DC/AC converter C1 and 32, 32' of the converter C2.

A filtering capacitor 3 is wired in parallel between the two positive 21 and negative 21' buses.

The construction and the operation of the various circuits of an electrical system such as this is described in detail in document WO 2005/081 387. In particular, each DC/AC converter comprises three arms wired in parallel with the DC terminals of the converter and corresponding respectively to the three phases of the motor MG1, MG2, each arm comprising two transistors each arranged with a diode antiparallel fashion.

Likewise, in such a layout, the DC/DC converter 1 comprises, in the manner represented schematically in FIG. 2, an inductor 11 having an input 11a wired to the positive terminal of the battery B and an output 11b wired to an intermediate neutral point 12 connected, respectively, to the positive bus 21 and to the negative bus 21' by two circuits in series 13, 13' each comprising a diode 14, 14' arranged in antiparallel fashion with a power transistor 15, 15'.

As shown by FIG. 2, the diodes 14, 14' allow the passage of the current between the two branches 21, 21', and the neutral point 12, to which the output of the inductor 11 is wired, is connected on one side to the emitter of the transistor 15 whose collector is connected to the positive bus 21 and on the other to the collector of the transistor 13' whose emitter is connected to the negative bus 21'.

In a known manner, as shown schematically by FIG. 2, to increase the admissible power, the converter 1 can comprise one or more other arms in parallel, with interleaved control, in the manner represented dashed in FIG. 2.

In a general manner, such a DC/DC converter makes it possible to boost the voltage at the terminals 31, 31' of the filtering capacitor 3, with respect to the voltage delivered at the terminals of the battery B. It makes it possible, on the one hand, to control the energy exchanges between the battery B and the electric machines MG1, MG2 in so-called "boost" motor mode or in recuperative braking mode and, on the other hand, to maintain the voltage of the filtering capacitor 3, that is to say between the positive bus 21 and negative bus 21', at an optimal value having regard to the conditions of forward progress of the vehicle which correspond to a torque and a certain rotation speed of the electric machines MG1, MG2.

Such a system for energy exchange between a storage element such as a battery and at least one motor-generator electric machine, comprising a DC/DC converter, a filtering capacitor and a DC/AC converter, is well known and had also been described in document EP 1 138 539. In this case, the electric machine served, as motor, to start the engine and, as generator, to recharge the battery, such a system thus making it possible to avoid employing an alternator.

Moreover, other layouts are possible for producing a DC/DC converter making it possible to boost the voltage between the two buses, positive and negative, and to control said voltage at an optimal value. For example, such a converter can be used as a supplement to an alternator in the manner described in the document FR-A-2 858 484 which gives several exemplary embodiments of a DC/DC converter comprising, in a general manner, an inductor having an input wired to the positive terminal of the battery and an output wired to an intermediate point connected to the negative bus and to the positive bus by two circuits in series, respectively a circuit generating a pulsed current and a voltage-raising circuit.

However, subsequently in the text, reference will essentially be made to the type of DC/DC converter described in the document WO 2005/081 387 and represented schematically in FIG. 2, comprising an inductor and two power transistors of the type with insulated gate termed an "Insulated Gate Bipolar Transistor" (IGBT).

As indicated above, such a converter makes it possible to maintain the voltage across the terminals of the filtering capacitor at an optimal value which depends on the conditions of forward progress of the vehicle, that is to say the torque/speed operating point of the electric machine or of the two machines in the case of document WO 2005/081 387. For this purpose, this document describes in detail how a control unit receiving information representative of the torque requested from each of the two motors and of their rotation speed, determines, at each instant, the requested optimal voltage between the terminals of the converter and orders the switching of the various circuits so as to obtain and maintain this optimal voltage.

In particular, it is known that, to determine the operating conditions of an electric machine, it is possible to plot a chart of the type represented in FIG. 3 indicating the torque as a function of the rotation speed and it is known that the envelope curve depends on the DC voltage across the terminals of an inverter. For example, represented in FIG. 3 are the envelope curves in motor mode corresponding respectively to DC voltages V1, V2, V3 with

V1>V2>V3 and it is apparent that the accessible torque at high speed is all the larger the higher the voltage.

This is why it is beneficial to have a stable filter voltage at an optimal value for the cost/performance ratio of a machine-inverter assembly. In the case of a hybrid vehicle represented in FIG. 1, the use of the DC/DC converter between the storage element B and the filter 3 shared by the inverters C1, C2 makes it possible, in the manner described in document WO 2005/081 387, to control the energy exchanges and to maintain the voltage of the filter at its optimal value.

However, the object of a hybrid vehicle is essentially to decrease fuel consumption and, consequently, pollution, by driving the wheels in an electrical manner whenever possible, on the basis of the energy stored in the battery or else, in a power bypass system, to produce electrically a continuous variation of the transmission ratio making it possible to choose, at each instant, an optimal ratio.

Now, in the conventional diagram of FIG. 1, the DC/DC converter 1 which is inserted into the efficiency chain decreases, through its own losses, the autonomous range under electric propulsion.

Moreover, the whole of the traction electrical power passes through the DC/DC converter, thereby requiring, for relatively high speeds, above 50 km/h for example, significant power and, therefore, an expensive, heavy and bulky converter.

This is why, by envisaging a large storage capacitor, the autonomous range would be degraded, and likewise for the mass and the cost of the assembly.

SUMMARY OF THE INVENTION

The object of the invention is to remedy these drawbacks by virtue of a new topology of the DC/DC converter as well as a new mode of control of the latter, making it possible to improve its efficiency in the electric propulsion phase (engine stopped), and to reduce the power passing into the converter, thereby making it possible to rate the latter as a function of the power of the electrical assistance (boost) and of the recuperative braking (brake) when the engine is operational and, consequently, to reduce its cost and its bulk.

The invention relates therefore, in a general manner, to a system for electrical energy exchange between at least one motor-generator element and at least one storage element determining a DC storage voltage between a positive bus and a negative bus to which are wired in parallel a voltage-booster DC/DC converter, a filtering capacitor for the delivery by said converter of a requested voltage between the positive bus and the negative bus, and a DC/AC converter, wired to at least one motor-generator element.

In accordance with the invention, the system comprises at least one thyristor wired up bypass fashion to the positive bus, between the storage element and the output of the voltage-booster converter, so as to short-circuit said converter and a means for priming the thyristor as a function of the voltage requested from the filtering capacitor, determining, at least in discharge mode, the short-circuiting of the voltage-booster converter with direct passage of the current through said thyristor, as long as the voltage of the filtering capacitor, substantially equal to the voltage of the battery, is sufficient for the electric machines to be able to provide the torque requested of them, such as is illustrated in the envelope curves of FIG. 3.

In a particularly advantageous manner, the system comprises two reverse thyristors wired in parallel between the battery and the positive bus for short-circuiting the voltage-booster converter by priming one of the thyristors in motor mode and the other thyristor in generator mode.

As is usual, the system comprises a means for regulating the voltage-booster converter for the delivery of an optimal requested voltage between the positive bus and the negative bus. In a particularly advantageous manner, this regulating means orders the priming of the thyristor in motor mode for a requested voltage below a given threshold and, when the requested voltage exceeds said threshold, determines a progressive increase of the current passing through the voltage-booster converter with decrease of the current passing into the thyristor until the latter is disabled and the bypass current becomes zero, the surplus current provided by the converter serving for the charging, at least of the filtering capacitor, up to a setpoint value.

In a preferential embodiment, the voltage-booster converter comprises an inductor having an input wired to a positive terminal of the storage element and an output wired to an intermediate point connected to the positive bus and to the negative bus by two circuits in series, respectively a first circuit comprising a diode arranged in antiparallel fashion with a power transistor whose emitter is connected to the negative bus and whose collector is connected to the intermediate point, and a second circuit comprising a diode arranged in antiparallel fashion with a power transistor whose emitter is connected to the intermediate point and whose collector is connected to the positive bus, the bypass circuit comprising a thyristor for short-circuiting the converter wired between the positive terminal of the storage element and the positive bus.

The invention applies especially to a hybrid vehicle comprising a main drive motor and at least one electric machine having two operating modes according to the motoring conditions and the driver's wishes, respectively a motor mode for which the machine produces a torque that is substituted for or added to the torque applied by the main engine and a generator mode for which the machine produces a current for charging the storage element and the filtering capacitor, the system comprising a means for regulating the voltage-booster converter so as to maintain at an optimal value the requested voltage between the two terminals of the filtering capacitor.

In accordance with the invention, the means for regulating the voltage-booster converter successively orders the disabling of the IGBTs of the voltage-booster converter when the requested current is substantially zero, the priming of the thyristor for the direct passage of the current through the bypass circuit with disabling of the voltage-booster converter when the requested optimal voltage is substantially below that of the storage element, and when the requested voltage exceeds said threshold, determines a progressive increase of the current passing through the converter with progressive decrease of the current passing through the thyristor, until the latter is disabled.

In a preferential embodiment, under electric traction, the voltage-booster converter is disabled as long as the storage voltage is sufficient to attain the requested torque-speed operating point, the vehicle being propelled by the electric machine alone with direct passage of the current solely through the thyristor.

Furthermore, as soon as the torque-speed operating point of the electric machine requires a filter voltage greater than the storage voltage, the regulating means orders a progressive increase of the current passing into the converter so that the latter resumes control of the voltage so as to maintain the latter at an optimal value corresponding to the operating point of the machine.

According to another preferential characteristic, starting from a state for which the power exchanged is substantially zero, the regulating means firstly orders the priming of the thyristor with disabling of the converter for the direct passage of the current through the thyristor to the storage voltage and then, when the necessary filter voltage exceeds the storage voltage, orders the progressive passage of the current through the converter for the control of the filter voltage as a function of the operating point of the electric machine.

Likewise, for the decrease of the voltage requested starting from a state where said voltage is greater than the storage voltage and is controlled by the DC/DC converter, the thyristor wired up bypass fashion is primed and the setpoint for the current passing into the converter is reduced so as to decrease the filter voltage to a value close to the storage voltage while preserving the voltage just necessary to retain the possibility of ordering the current into the inductor of the converter and then the power transistors are disabled and the current in the inductor decreases whereas the current in the thyristor increases until it provides a filter voltage equal to the storage voltage, the gate current of the thyristor then being suppressed.

Advantageously, the DC/DC converter is regulated in such a way that the passage of current into the inductor limits the growth in the thyristor to the priming of the latter without requiring any aid to switching.

Moreover, the invention applies especially to the case of a hybrid vehicle comprising two motor-generator electric machines. In this case, the DC/DC converter is regulated so as to attain the maximum voltage required by one or the other of the two machines as a function of their operating points.

BRIEF DESCRIPTION OF THE DRAWINGS

Other advantageous characteristics will become apparent in the following description of a particular embodiment, given by way of simple example and illustrated by the appended drawings.

FIG. 6 schematically shows the two permanent states (FIG. 6a and FIG. 6b) of the circuit according to the operating mode.

FIG. 7 is a timechart of a thyristor-converter transition.

DESCRIPTION OF THE PREFERRED EMBODIMENTS

As indicated above, various types of hybrid propulsion systems are known, comprising an engine and one or more electric machines able to operate in motor mode or generator mode so as to impart, in motor mode, a torque which can be substituted for or be added to the torque provided by the engine or else, when stopped, serve for the starting of the engine and which can also be propelled by the engine so as to serve, in generator mode, for the recharging of the battery. Usually, each electric machine with three-phase current is connected to the battery by a DC/AC converter and by a voltage-booster DC/DC converter which is arranged in parallel with a filtering capacitor.

Such converters are described in detail, for example in the documents WO 2005/036 297 and WO 2055/081 387.

Figure 1:
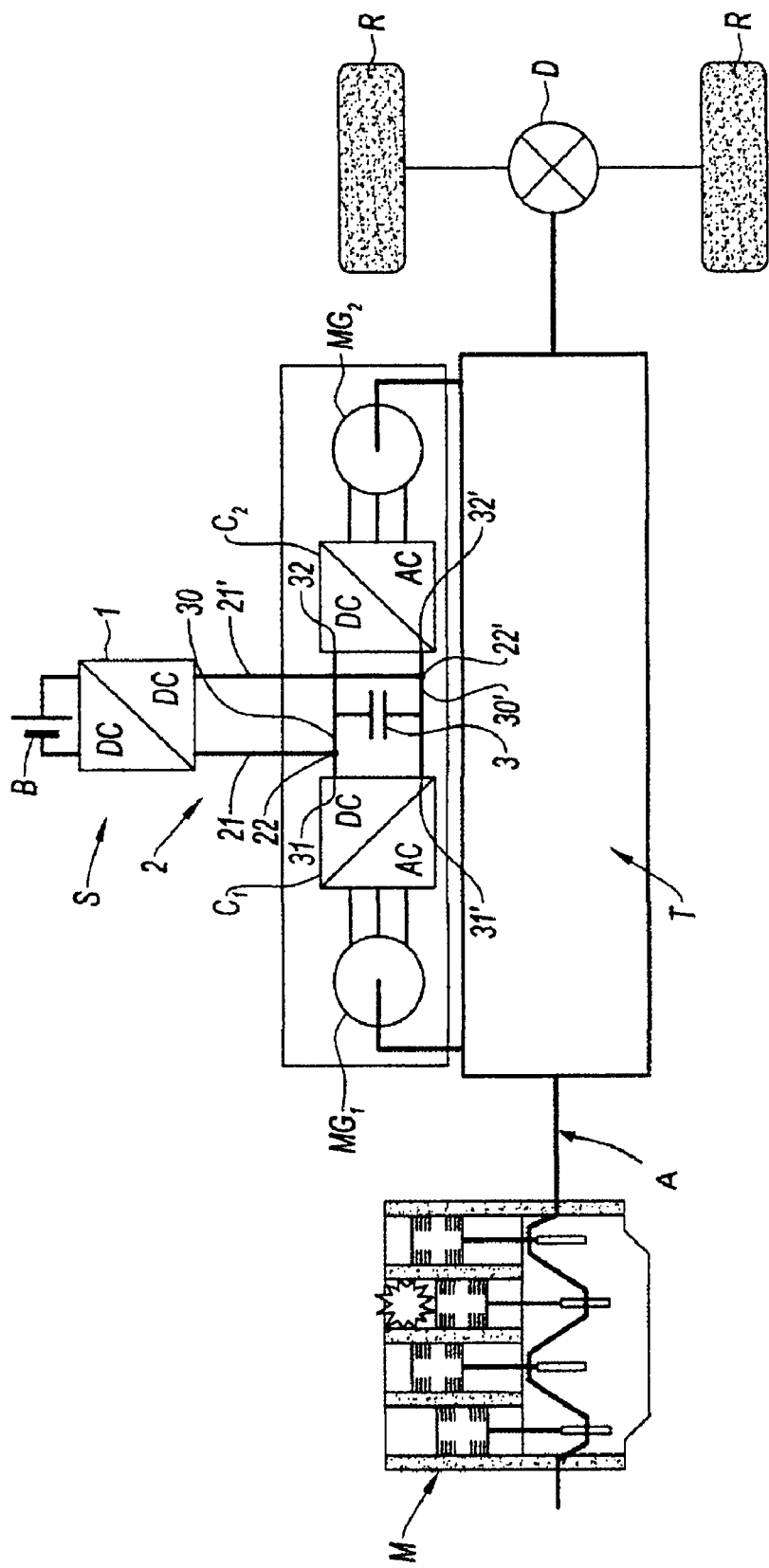
FIG. 1 is a basic diagram of a power-bypass hybrid vehicle.

The present invention implements electrical circuits of this type and applies especially to a hybrid vehicle comprising an electrical power bypass energy exchange system the principle of which is illustrated by FIG. 1.

Such a vehicle therefore comprises an internal combustion engine M whose output shaft A is connected to the driving wheels R by a mechanical transmission T and a power bypass system S comprising two motor-generator electric machines MG1 and MG2 which are of the three-phase type and are each wired to a DC/AC converter, these two converters C1, C2 being connected by a "bus" circuit to two branches 30, 30'.

An electrical power bypass system such as this allows, in particular, continuous variation of the geardown ratio between the transmission shaft A and the driving wheels R. Indeed, a bypass mechanical power flux makes it possible, on the basis of the transmission T, to drive the first electric machine MG1 which, by operating as a generator, provides electrical power transmitted to the second machine MG2 which then provides a drive torque applied to the transmission T. For this purpose, the energy exchanges between the main engine and the two machines are regulated by a control unit receiving the various information necessary for the driving of the vehicle and relating, in particular, to the running conditions, climbing, descending or turning as well as an item of information regarding the driver's wishes represented by his action on the acceleration pedal or on the brake. On the basis of this information, this control unit can calculate the optimal voltages which must be applied to the electric machines MG1, MG2, or provided by them, in order to vary the transmission ratio in a continuous manner so as to apply the desired torque to the driving wheels.

Figure 3:
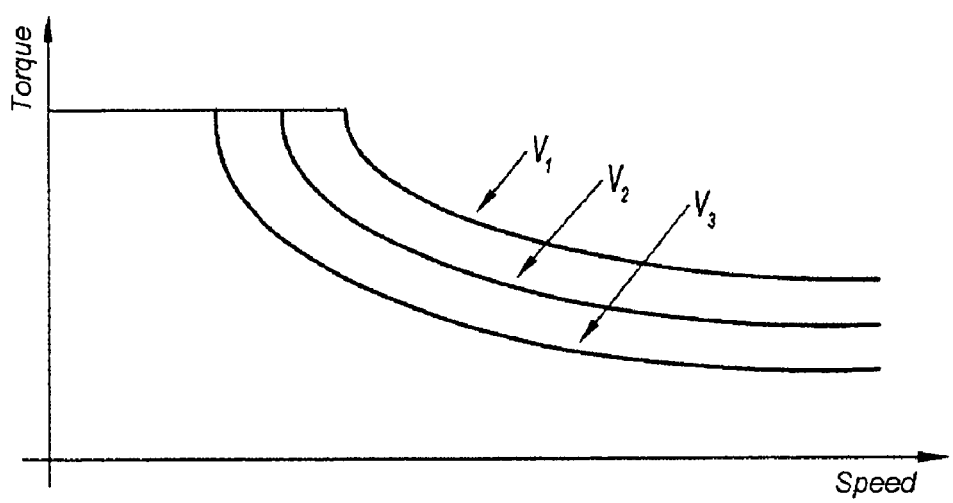
FIG. 3 is a chart representing the form of the torque-speed envelope curves according to the inverter's supply voltage.

Indeed, as shown by FIG. 3, the torque/rotation speed ratio of an electric machine depends on the voltage applied between its terminals, the accessible torque at high speed being all the larger the higher the voltage.

In the case of a power bypass system of the type represented in FIG. 1, the control unit (not represented) will therefore determine, as a function of the running conditions and of the driver's wishes, a torque/speed operating point corresponding to an optimal voltage for each of the two machines MG1, MG2.

Figure 5:
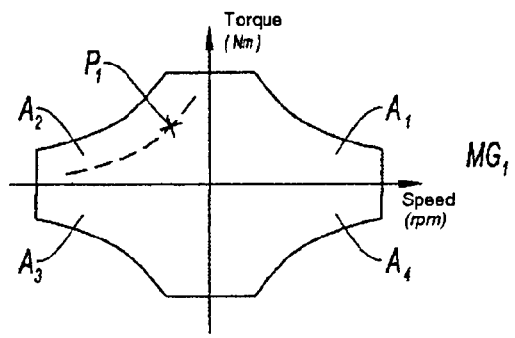
FIG. 5 is a chart illustrating the calculation of the voltage at the output of the converter as a function of the torque-speed operating points of two electric machines.
Figure 5:
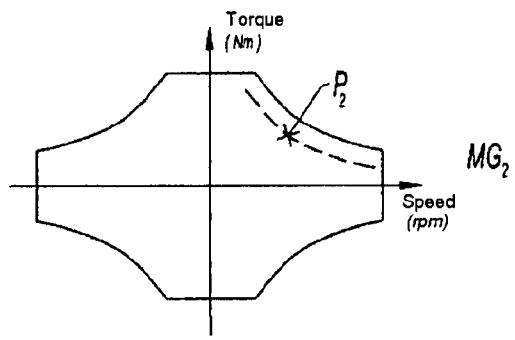

FIG. 5, for example, indicates, according to the voltage, the operating points that can be attained on two superimposed charts corresponding, at the top, to the machine MG1 and at the bottom to the machine MG2. In each chart, the sectors A1 and A3 for which the torque and the speed are of the same sign, correspond to operation in motor mode while the sectors A2 and A4 for which the torque and the speed are of opposite signs, correspond to operation in generator mode.

For example, in FIG. 5, the point P1 corresponds to generator mode operation of the machine MG1 and the point P2 corresponds to motor mode operation of the machine MG2.

The control unit can therefore calculate, as a function of the information that it receives on the running conditions and the driver's wishes, the optimal voltages to be applied to the two machines MG1, MG2, in particular to minimize the losses of the inverter C1, C2 for the chosen operating point P1, P2.

However, the two inverters are subjected to the same voltage applied to the two branches 30, 30' of the bus circuit and this voltage must therefore be the higher voltage of the voltages required by each machine calculated by the control unit.

Moreover, the voltage provided by the generator MG1 driven by the motor M depends on the speed of the motor, and likewise the drive torque provided by the machine MG2 depends on this voltage. This is why the two branches of the linking circuit 3 are connected to the two poles of the battery B by way of a DC/DC converter 1 arranged in parallel with a filtering capacitor 3, in the manner described for example in document WO 2005/081 387, cited above.

Figure 2:
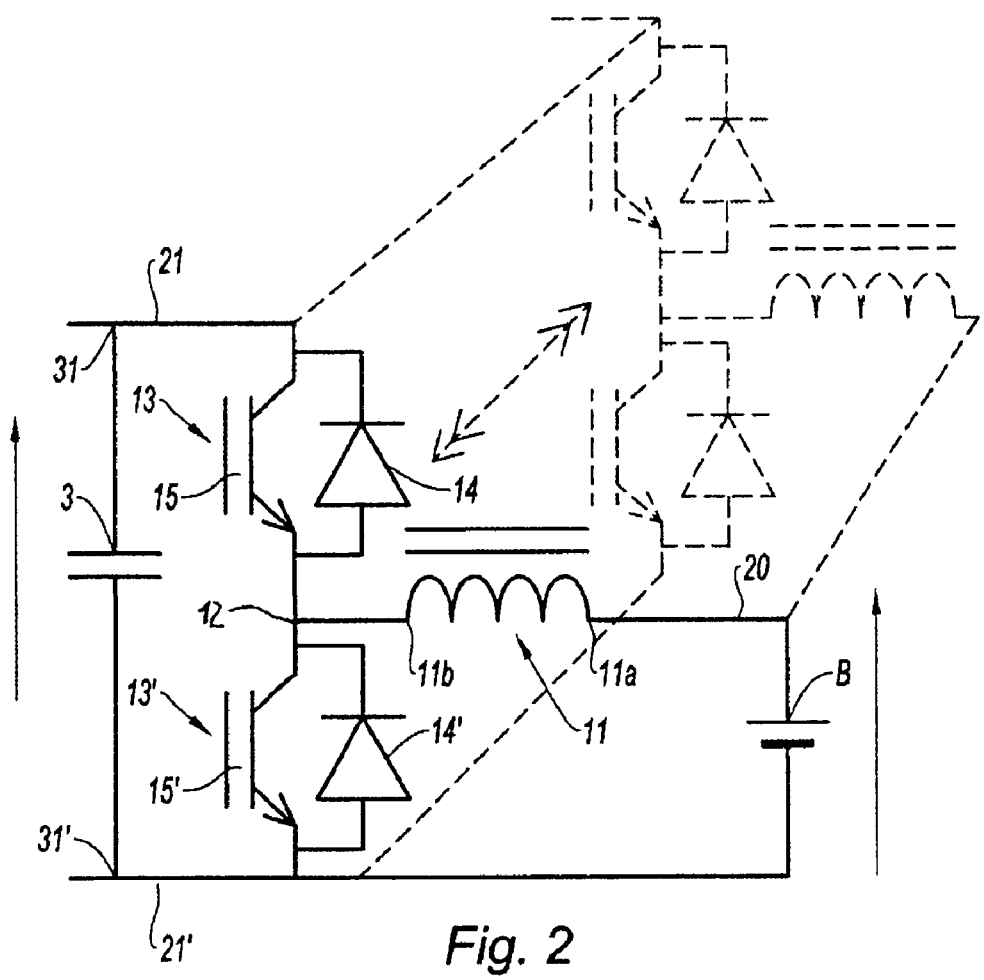
FIG. 2 is a diagram of a DC/DC converter of conventional type.

Such an arrangement makes it possible, in particular, to establish a stable filter voltage at an optimal value for the cost/performance ratio of the machine-inverter assemblies. In particular, in the case of a system with two electric machines, this converter is of the type described in detail in the document WO 2005/081 387 and represented in FIG. 2 which makes it possible, on the one hand, to control the exchanges of energy between the storage and the dynamics of the vehicle and, on the other hand, to maintain the filter voltage at its optimal value.

However, in such a system, all the electrical power passes through the DC/DC converter 1 which must therefore be rated accordingly and, furthermore, decreases the autonomous range under electric propulsion, on account of its self-losses.

Figure 4:
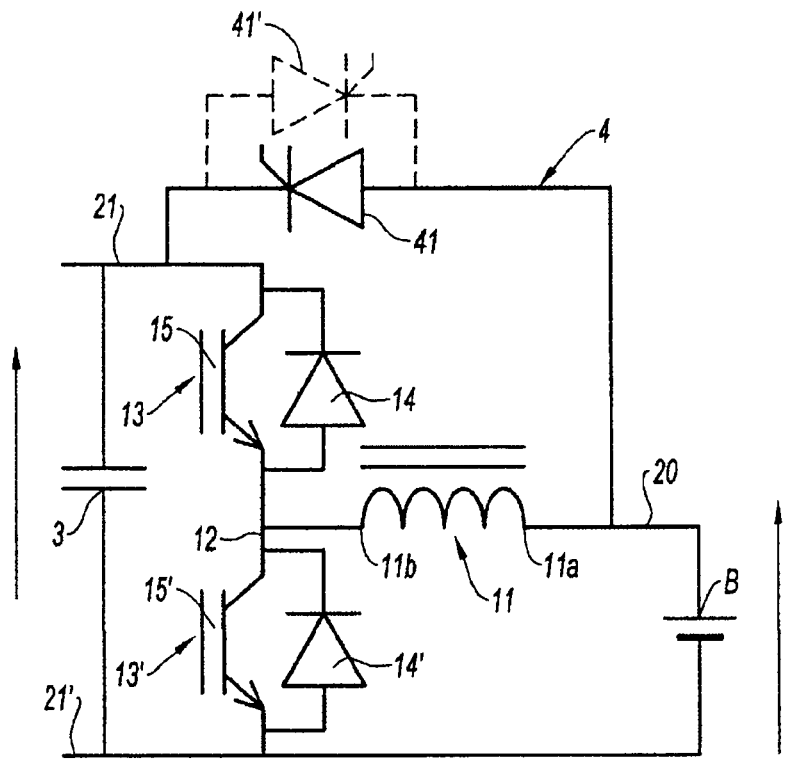
FIG. 4 is a diagram of the DC/DC converter according to the invention.

The invention makes it possible to solve this problem by virtue of the layout represented in FIG. 4.

The DC/DC converter 1 is of the known type comprising an inductor 11 having an input 11a connected by the power supply line 20 to the positive terminal of the battery and an output 11b wired to an intermediate point 12 between two circuits 13, 13' arranged in series and each comprising a diode 14, 14' and a power transistor 15, 15' arranged in antiparallel fashion, the collector of the transistor 15 being wired to the positive bus 21 while the emitter of the transistor 15' is wired to the negative bus 21'.

According to the invention, the converter 1 can be short-circuited by a bypass linking circuit 4 between the power supply line 20 connected to the positive pole of the battery B and the positive bus 21 comprising a thyristor 41 represented by solid lines, for operation in motor mode alone and, optionally, a second thyristor 41', of reverse sense, represented dashed, for operation in motor and generator mode.

The two thyristors 41, 41' can be primed on command of the control unit. One and the same single command operates both gates.

In a general manner, under normal operation at reduced speed, the vehicle can be driven in "all electric" mode as long as the speed remains fairly low, for example in congestion. As long as the storage voltage provided by the battery B is sufficient to attain the torque-speed operating point of the two machines, the current can pass directly through the thyristor 41, in the manner represented in FIG. 6a, by short-circuiting the converter 1, represented dashed, whose transistors 15, 15' are disabled by the control unit. During this phase, the losses are limited to the thyristor's conduction losses and, by virtue of the short-circuiting of the converter 1, the losses generated by the latter are eliminated, that is to say the iron and Joule losses in the inductor 11 and the conduction and switching losses in the transistors 15, 15' and the diodes 14, 14'.

On the other hand, as soon as the information provided to the control unit indicates that the operating point of at least one of the two machines MG1 and MG2 requires a filter voltage greater than the storage voltage provided by the battery, the control unit causes the transistors 15, 15' to switch, so as to cause the current to pass into the converter 1 which progressively resumes control of the voltage. In particular, the converter 1 is regulated by the control unit so as to determine the optimal voltages to be applied to the machines in order to obtain the desired torques and, furthermore, so as to minimize the losses in the machines, the converter 1 and the inverters C1, C2.

As shown by FIG. 5, the more the power and the rotation speed of the machines increase, the higher must be the voltage at the output of the converter 1. As there are two electric machines MG1, MG2, the voltage at the output of the converter 1 is calculated so as to attain the operating point having the higher voltage.

As the power of the converter 1 climbs, the current in the thyristor 41 decreases progressively until it vanishes, causing the disabling of the thyristor. The circuit is then in a permanent state of regulation by the converter 1, represented in FIG. 6b.

The transition from the circuit 6a to the circuit 6b is made progressively in the manner represented schematically in the timechart of FIG. 7 which indicates, as a function of time, the variation of the strength of the current passing respectively into the gate (curve 51), into the thyristor 41 (52), into the inductor 11 (53) and into the transistors 15, 15' (54).

In phase 1, the vehicle has stopped and the power exchanged is substantially zero.

Phase 2 corresponds to a progressive acceleration of the vehicle while remaining at low speed, for example during congestion. When the vehicle has to progress forward, the control unit energizes the gate (curve 51) so as to prime the thyristor 41 in which the current increases progressively until it is steady at the value (52) corresponding to the required voltage which, at low speed, is at the most equal to the storage voltage provided by the battery. Once the current has become steady in the thyristor, this state is stable and it is no longer necessary to maintain the current in the gate (51a).

Phase 3 corresponds to an acceleration request which requires a voltage greater than the storage voltage so as to optimize the operation of the machines. The control unit then orders the switching of the transistors 15, 15' of the converter 1 so as to progressively increase the current passing into the inductor 11, as indicated by the ramp 53.

The request for current on the continuous bus 21, 21' being substantially the same, the current in the thyristor 41 will decrease until it vanishes (part 52a), causing the disabling of the thyristor.

The filter voltage remains equal to the storage voltage.

In phase 4, the converter 1 provides a surplus current (part 53a) making it possible to charge the filtering capacitor 3 to a setpoint value (part 53b).

In phase 5 all the required power passes through the converter 1, the circuit being in the state of FIG. 6b and the current passing into the transistors 15, 15' corresponding to the zone 54, according to the optimal voltage to be provided, determined by the control unit.

Figure 8:
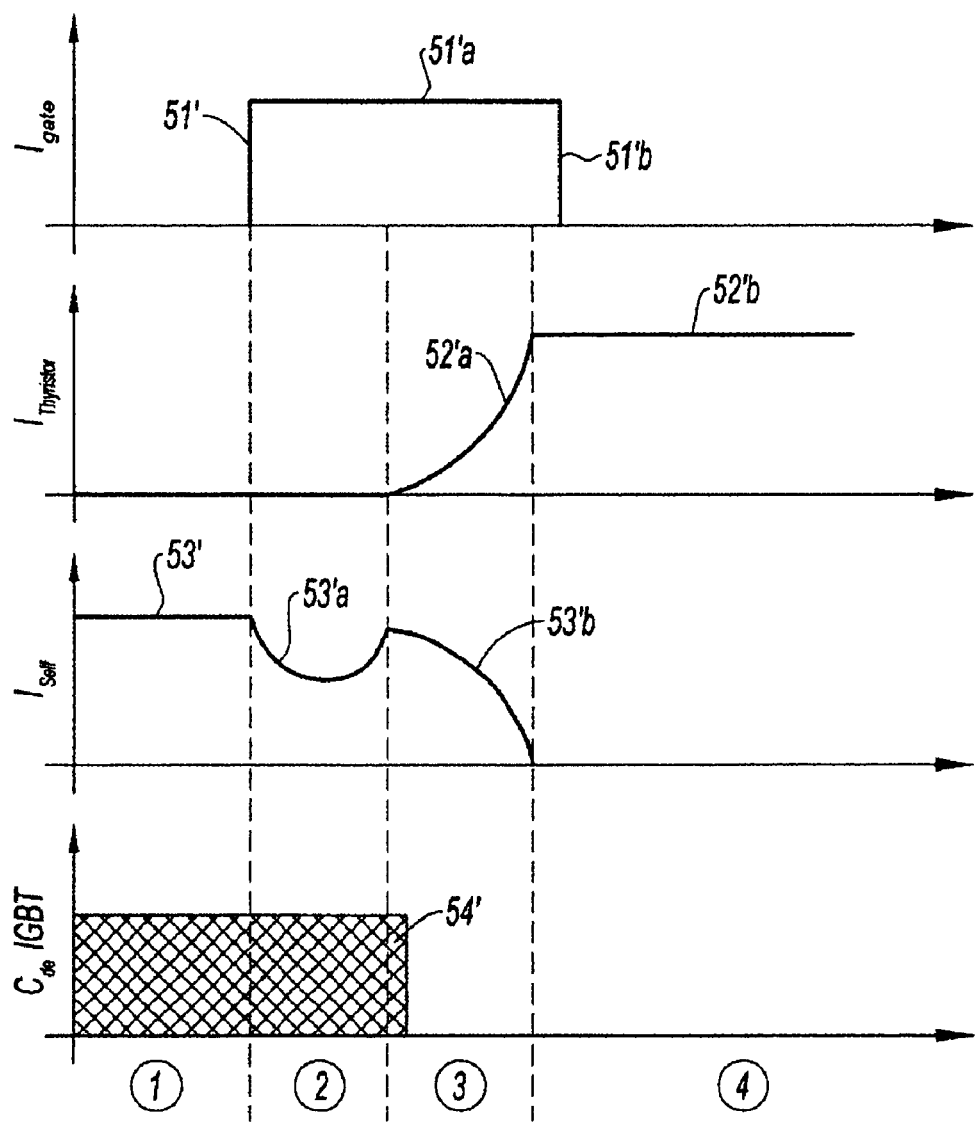
FIG. 8 is a timechart of a converter-thyristor transition.

Conversely, FIG. 8 is a timechart illustrating a decrease in the filter-voltage to a voltage close to the storage voltage, for example for a slowing of the vehicle to a relatively low speed.

In phase 1, the circuit is in the state of FIG. 6b, all the current passing through the DC/DC converter 1. The inductor 11 therefore allows a current of strength 53' to pass.

When the information received by the control unit requires a lowering of the filter voltage, the gate of the thyristor 41 is primed (curve 51') even though the latter, subjected to a reverse voltage, cannot conduct current. At the same time, the voltage of the filter is decreased to a voltage close to the storage voltage while maintaining, however, the voltage difference necessary to retain control of the current in the inductor (curve 53'*a*).

In phase 3, the control unit disables the IGBT transistors 15, 15' and the current in the inductor 11 decays progressively (53'*b*) whereas the current passing into the thyristor 41, already primed, grows (52'*a*) until, in phase 4, the thyristor provides all of the filter current (52'*b*). All the current then passes through the thyristor 41 and it is possible to cut off the power supply to the gate of the thyristor (51'*b*). The circuit is then in the state of FIG. 6*a*.

By virtue of the invention, under all electric motoring, the power originating from the storage element passes directly through the bypass circuit 4 and is therefore no longer limited by the power of the converter 1 but only by the machines, the battery B or the thyristor 41. Relative to the known techniques, it is therefore possible for the DC/DC converter 1 to be under-rated in terms of power, resuming control of the current only when the operating point of one of the machines requests a filter voltage greater than the storage voltage provided by the battery.

On the other hand, as soon as the operating points of the two machines so allow, the control unit can disable the transistors of the converter 1 so as to operate with minimum losses.

It should be noted, moreover, that, having regard to the small voltage difference applied to the inductor 11, the variation of current in phase 3 is sufficiently small not to have to add any element to aid switching (snubbers) in order to limit the growth of the current in the thyristor.

Of course, the invention is not limited to the sole embodiment just described, it being possible for other layouts or equivalent circuits to allow operation in the manner claimed while remaining within the scope of protection of the invention.

In particular, the circuit of FIGS. 6*a* and 6*b*, with a single thyristor 41, is provided for operation in motor mode for which the power passing through the converter 1 may be significant if a capability for all electric motoring at relatively high speeds is desired.

However, the invention also presents advantages in generator mode and this is why in the manner indicated in FIG. 4, the bypass circuit 4 can also comprise a second reverse thyristor 41' so as allow the current to pass in both directions.

Moreover, the invention is especially suited to the operation of a hybrid vehicle with electrical power bypass using two electric machines operating, one as generator and the other as motor, but would also present advantages within the context of a parallel hybrid comprising a single electric machine.

Moreover, for the passage of large powers, it is particularly advantageous to use a DC/DC converter of the type described in detail and represented in the drawings but the short-circuiting of the converter, according to the invention, would also present advantages for other arrangements of DC/DC converters such as described, for example, in the document FR-A-2 858 484.

The invention claimed is:

1. A system for electrical energy exchange between at least one motor-generator element and at least one storage element determining a DC storage voltage between two branches of a bus circuit to which are wired in parallel a voltage-booster DC/DC converter, a filtering capacitor for delivery by the converter of a requested voltage between a positive bus and a negative bus, and a DC/AC converter wired to at least one motor-generator element, the system comprising:

at least one thyristor wired in a bypass fashion to the positive bus, between the storage element and the output of the voltage-booster converter, so as to short-circuit the voltage booster converter; and means for priming the thyristor as a function of voltage requested from the filtering capacitor, determining, at least in discharge mode, the short-circuiting of the voltage-booster converter with direct passage of the current through the thyristor, as long as the voltage of the filtering capacitor substantially equal to the voltage of the storage element, is sufficient.

2. The energy exchange system as claimed in claim 1, comprising two reverse thyristors wired in parallel between the positive bus and the storage element for the short-circuiting of the voltage-booster converter by priming of one of the thyristors in a motor mode and the other thyristor in a generator mode.

3. The energy exchange system as claimed in claim 1, further comprising means for regulating the voltage-booster converter for delivery of an optimal requested voltage between the positive bus and the negative bus, wherein the regulating means orders the priming of the thyristor in a motor mode for a requested voltage below a given threshold and, when the requested voltage exceeds the threshold, determines a progressive increase of current passing through the voltage-booster converter with decrease of current passing into the thyristor until the latter is disabled and the bypass current becomes zero, surplus current provided by the voltage booster converter serving for the charging, at least of the filtering capacitor up to a setpoint value.

4. The energy exchange system as claimed in claim 1, wherein the voltage-booster converter comprises an inductor comprising an input wired to a positive terminal of the storage element and an output wired to an intermediate point connected to the positive bus and to the negative bus by two circuits in series, including respectively a first circuit comprising a diode arranged in antiparallel fashion with a power transistor whose emitter is connected to the negative bus and whose collector is connected to the intermediate point, and a second circuit comprising a diode arranged in antiparallel fashion with a power transistor whose emitter is connected to the intermediate point and whose collector is connected to the positive bus, and the bypass circuit comprising a thyristor for short-circuiting the voltage booster converter wired between the positive terminal of the storage element and the positive bus.

5. The energy exchange system as claimed in claim 1, applied to a power-bypass hybrid vehicle comprising a main drive motor and at least one electric machine wired to the DC/AC converter connected to an element for storing a DC voltage by a positive bus and a negative bus between that are wired in parallel, a filtering capacitor, and a voltage-booster converter, the electric machine including two operating modes according to motoring conditions and a driver's wishes, including respectively a motor mode for which the machine produces a torque that is substituted for or added to torque applied by the main drive motor and a generator mode for which the machine produces a current for charging the storage element and the filtering capacitor, the system further comprising means for regulating the voltage-booster converter so as to maintain at an optimal value the requested voltage between the positive bus and the negative bus.

6. The energy exchange system for hybrid vehicle as claimed in claim 5, wherein the means for regulating the voltage-booster converter orders disabling of IGBTs of the voltage-booster converter when a requested current is substantially zero, the priming of the thyristor for the direct passage of the current through the bypass circuit with disabling of the voltage-booster converter when the requested optimal voltage is substantially below that of the storage element, and when the requested voltage exceeds the threshold, determines a progressive increase of the current passing through the voltage booster converter with progressive decrease of the current passing through the thyristor, until the latter is disabled.

7. The energy exchange system for hybrid vehicle as claimed in claim 6, wherein, under electric traction, the voltage-booster converter is disabled as long as the storage voltage is sufficient to attain a requested torque-speed operating point, the vehicle being propelled solely by the electric machine with direct passage of the current solely through the thyristor.

8. The energy exchange system as claimed in claim 7, wherein, as soon as the torque-speed operating point of the electric machine requires a filter voltage greater than the storage voltage, the regulating means orders a progressive increase of the current passing into the voltage booster converter so that the latter resumes control of the voltage so as to maintain the latter at an optimal value corresponding to the operating point of the machine.

9. The energy exchange system as claimed in claim 6, comprising two motor-generator electric machines and that the DC/DC converter is regulated so as to attain the maximum voltage required by one or the other of the two machines as a function of their operating points.

10. The energy exchange system as claimed in claim 1, wherein, starting from a state for which the power exchanged is substantially zero, a regulating means firstly orders the priming of the thyristor with disabling of the converter for the direct passage of the current through the thyristor to the storage voltage and then, when a necessary filter-voltage exceeds the storage voltage, orders progressive passage of the current through the converter for the control of the filter voltage as a function of an operating point of an electric machine.

11. The energy exchange system as claimed in claim 1, wherein, for a decrease of the voltage requested starting from a state where the voltage is greater than the storage voltage and controlled by the DC/DC converter, the thyristor wired in bypass fashion is primed and the setpoint for the current passing into the voltage booster converter is reduced so as to decrease the filter-voltage to a value close to the storage voltage while preserving the voltage just necessary to retain the possibility of ordering the current into the inductor of the voltage booster converter and then the power transistors are disabled and the current in the inductor decreases whereas the current in the thyristor increases until it provides a filter voltage equal to the storage voltage, a gate current of the thyristor then being suppressed.

12. The energy exchange system as claimed in claim 11, wherein the DC/DC converter is regulated such that passage of current in the inductor limits the growth of the current in the thyristor to the priming of the latter.

* * * * *